Nov. 8, 1966 K. H. GERHARDS 3,284,564

AUTOMATIC CIRCUIT SAMPLER GARBLE DETECTOR

Filed March 14, 1963 3 Sheets-Sheet 1

INVENTOR,
KARL H. GERHARDS.

BY Edward J. Kelly

ATTORNEY.

Nov. 8, 1966 K. H. GERHARDS 3,284,564

AUTOMATIC CIRCUIT SAMPLER GARBLE DETECTOR

Filed March 14, 1963 3 Sheets-Sheet 2

INVENTOR,
KARL H. GERHARDS.

BY Edward J. Kelly

ATTORNEY.

AUTOMATIC CIRCUIT SAMPLER GARBLE DETECTOR

Filed March 14, 1963

INVENTOR,
KARL H. GERHARDS.

BY Edward J. Kelly

ATTORNEY.

United States Patent Office
3,284,564
Patented Nov. 8, 1966

3,284,564
AUTOMATIC CIRCUIT SAMPLER GARBLE DETECTOR

Karl H. Gerhards, 1204 Delaware, Leavenworth, Kans.
Filed Mar. 14, 1963, Ser. No. 265,606
6 Claims. (Cl. 178—4)

Figure 1A:
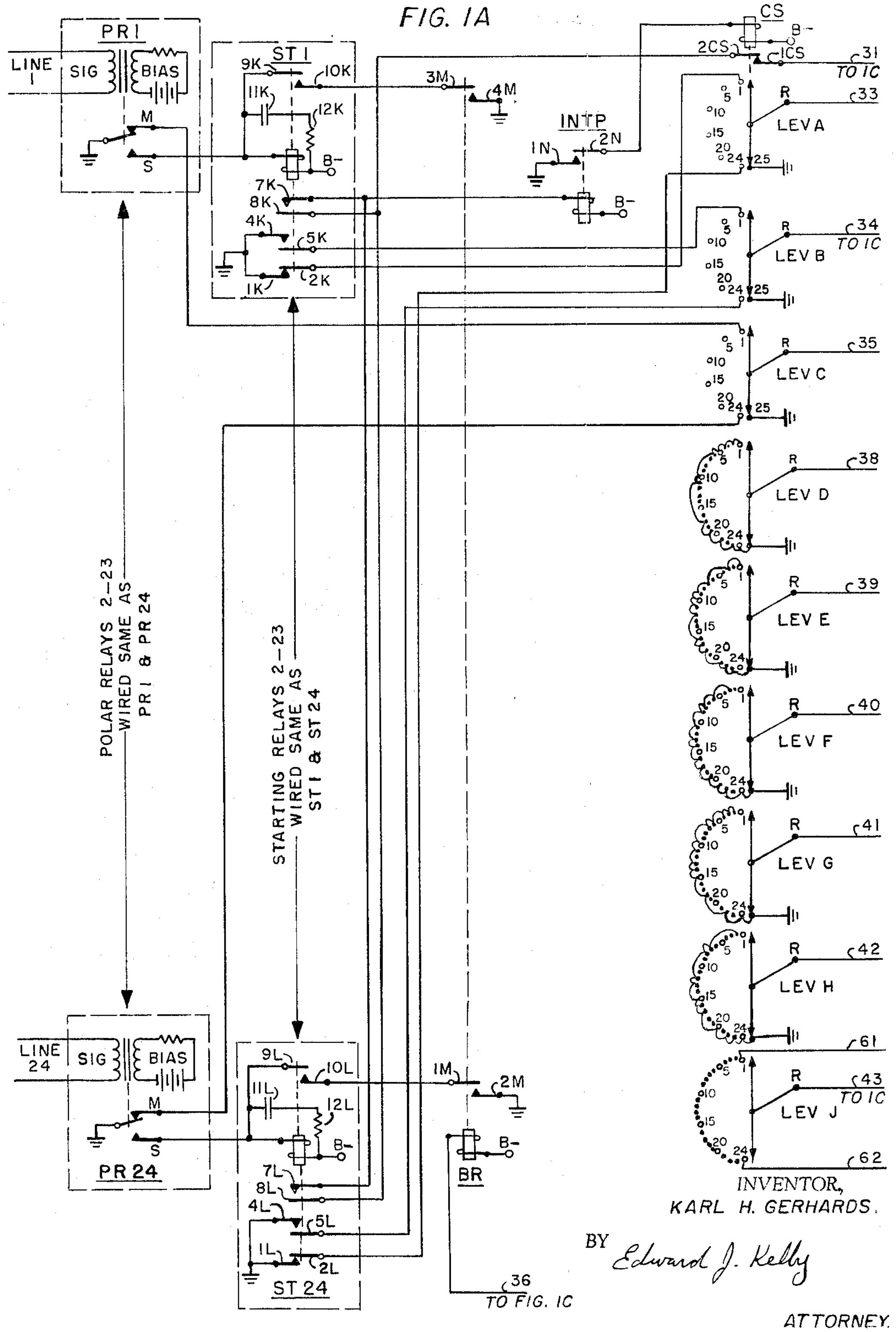

The invention described herein may be manufactured and used by or for the Government for governmental purposes without the payment of any royalty thereon.

The present invention relates to automatic garble or error detection equipment for use in telegraph transmission systems. The invention is particularly useful at automatic Teletype relay stations wherein certain control functions such as start-of-message indicators, channel numbers, precedence codes, routing indicators and end-of-message functions are transmitted with the message text and used to automatically route and control the retransmission from the relay station. Failure to recognize any of these control functions due to garbled or erroneous transmission results in incorrect processing and routing of the message text.

The automatic circuit sampler garble detector disclosed herein detects errors by searching the message text for the presence of a "carriage return" signal followed by a "line feed" signal, which characterizes the end of each line of Teletype text. If these two signals are not detected in the proper sequence within a period of time sufficient to transmit at least one line of Teletype text, it is assumed that the line is in garbled condition and an alarm is actuated. This novel method of error detection does not require the transmission of any parity bits or codes nor require special error-checking codes such as the so-called equal ratio codes. Both of these prior art error checking methods necessarily involve redundancy in the transmission of intelligence and require specialized transmission equipment throughout the entire transmission network, whereas the garble detector of the present invention may be tied in with any standard commercial or military Teletype network without modification to the network itself.

Briefly stated, the present invention comprises an electromechanical device which is connected to a plurality of Teletype lines at a relay station. The device will sample the lines in a pre-arranged sequence. When a line carrying traffic is encountered, a pre-assigned identification letter coresponding to the sampled line is automatically printed. Following the transmission of this identification letter to the sampler printer, the Teletype line being sampled is switched to the input of an electromechanical code reader, a timing circuit simultaneously begins to count seconds of elapsed time and an alarm circuit is set up but not actuated. The code reader reads the message text in search of a carriage return and a line feed function in sequence. If these two functions are not detected within 9 seconds of monitoring time, it is assumed that the line is in garbled condition and the alarm circuit is actuated. The detection of these two functions in the proper sequence interrupts the alarm circuit and causes the sampler to step off the line involved and hunt for another circuit carrying traffic. Provision is also made for manually extending monitoring time and manual selection of any desired line. In order to eliminate false alarms which may be caused by the transmission of blank functions following message text, the sampler is designed to release itself from the line being monitored after four consecutive blanks are received.

It is therefore an object of the present invention to provide a novel means and method of preventing the retransmission of garbled signals from a Teletype relay station.

It is a further object of the present invention to provide novel and useful circuitry for automatically monitoring a plurality of Teletype lines to detect erroneous or garbled transmission.

Other objects and advantages of the invention will become apparent from the following detailed description and drawings, in which FIGS. 1A, B and C comprise a single schematic diagram of the device and should be arranged from left to right in the order named.

The garble detector illustrated is capable of monitoring twenty-four Teletype lines. Each of the twenty-four lines is associated with a polar relay, a starting relay and an alarm relay. The remaining relays, switches and components are common to all 24 circuits. It should be noted that all the relays are shown in the de-energized or restored condition and all of the rotary selector switches are shown in the normal or home position. Some of the relay contacts are shown above the associated relay coil and some below. Dashed lines are used to connect all of the relay contacts to the associated relay coils. The straight contact of all the relays is the movable armature-actuated contact and the triangular contact is the stationary one.

Figure 1B:
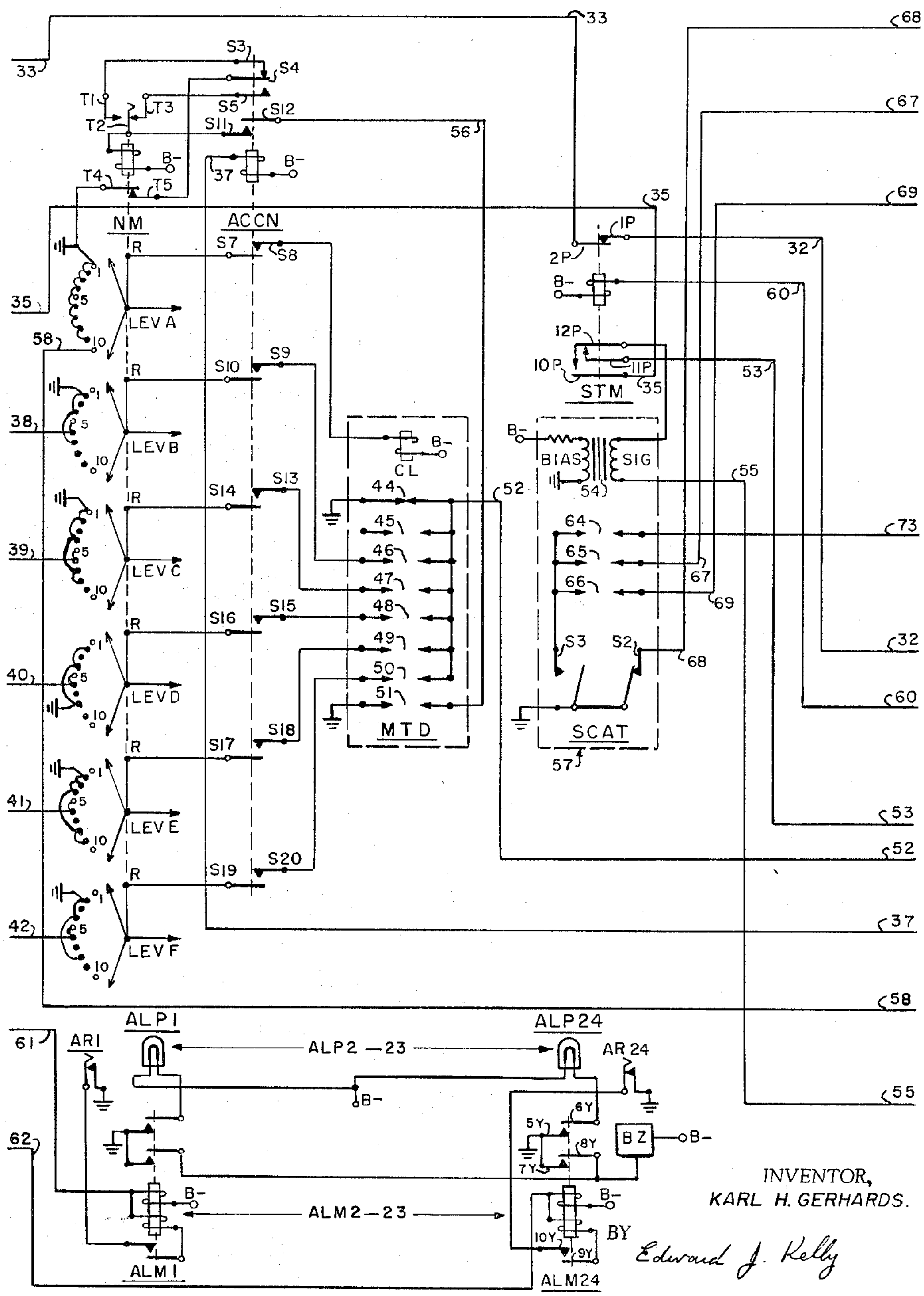
Figure 1C:
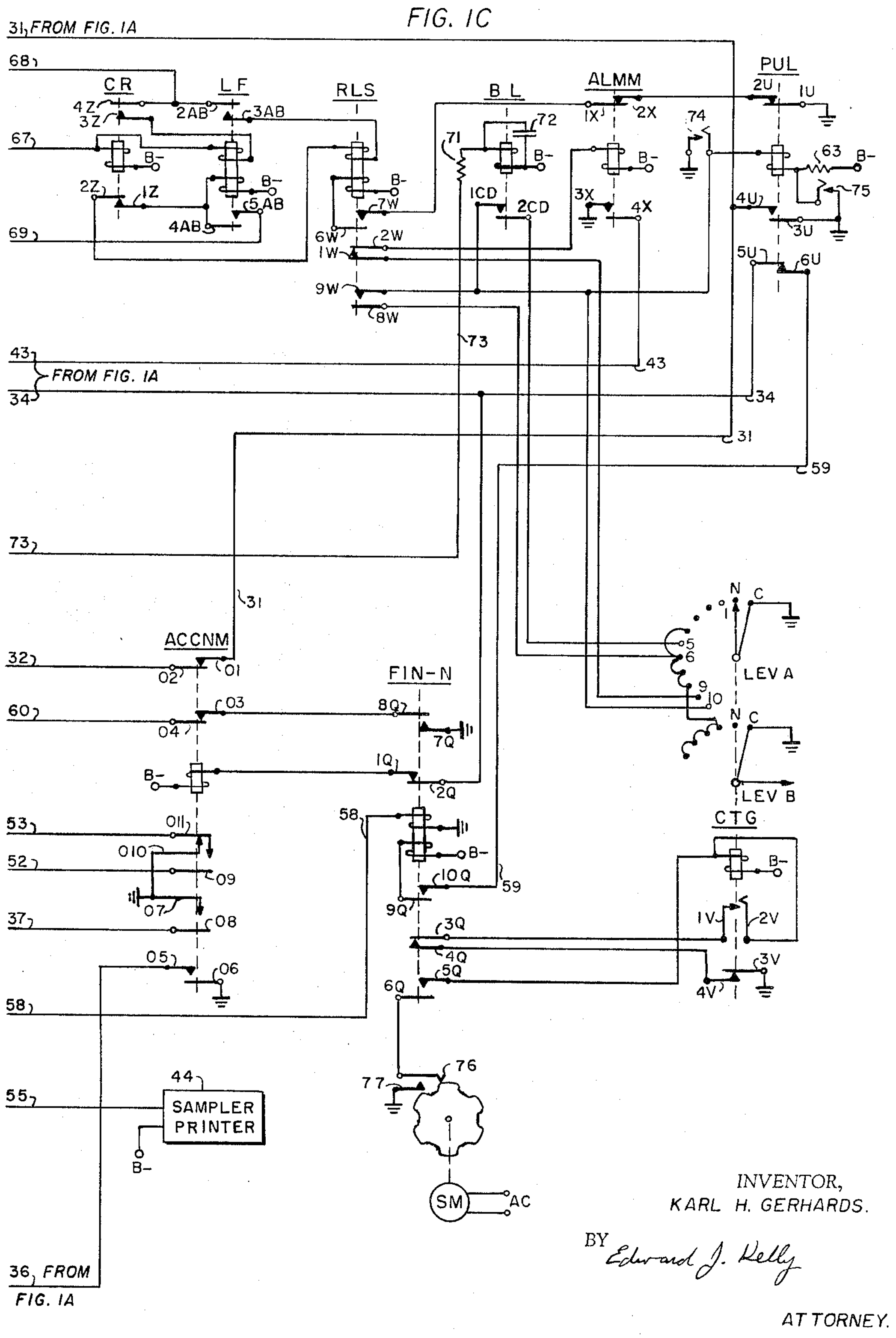

In FIG. 1A polar relay PR1 has its signal winding connected to Teletype line 1 and its bias winding connected to a source of steady direct current. The mark contact M of PR1 is connected to contact 1, level C of circuit selector rotary switch CS. The signal winding of polar relay PR24 is connected to Teletype line 24 and its mark contact M is connected to contact 24, level C of CS. There are twenty-two other similar polar relays similarly connected to twenty-two other Teletype lines and to the coresponding contacts on level C of CS; but these have not been illustrated to avoid unnecessary complexity in the drawing. Each of the polar relays has a starting relay associated therewith, two of which, ST1 and ST24 are illustrated in FIG. 1A. The coil of each starting relay is connected to the space contact S of its associated polar relay. The No. 7 contact of each starting relay is connected to the upper coil terminal of interrupter relay INTP. The No. 5 contact of each starting relay is connected to a different one of the 24 contacts on level B of the circuit selector rotary switch CS. In describing the operation of the circuitry it will be assumed that traffic is being received only on Teletype line 24. The armature of polar relay PR24 will ground the mark contact M or the space contact S thereof in response to the line current or absence thereof in the signal winding of PR24. The first space pulse on line 24 will operate relay ST24 via battery B— and contact S of PR24. ST24 remains operated (energized) during succeeding mark signals due to the discharge of capacitor 11L through the winding of ST24. Contacts 7L–8L of ST24 operate interrupter relay INTP via B— battery, INTP coil, contacts 7L–8L, interrupter contacts 2CS–1CS of rotary circuit selector switch CS, lead 31, contacts 01–02 of relay ACCMN (FIG. 1C), lead 32, contacts 1P–2P of relay STM (FIG. 1B) lead 33 rotor contact R of level A of CS to ground via contact 25 thereof. The operation of relay INTP operates coil CS via contacts 1N–2N. The operation of CS opens contacts 2CS–1CS which are the interrupter contacts of rotary circuit selector switch CS. This restores (de-energizes) INTP which in turn restores coil CS, causing all of the rotary switches actuated thereby (levels A–J) to step to contact 1 and also closing interrupter contacts 2CS–1CS. Since contact 1, level A of CS is grounded by contacts 1K–2K of ST1, the cycle is repeated and CS steps until it encounters an operated starting relay which is indicative of a line carrying traffic. In the present example, CS will step until the rotor of level A, as well as all the other rotors of levels B–J, reaches contact 24 where it will encounter an absence of ground due to the open 1L–2L contacts of ST24. Line 24 has now been selected for identification and monitoring. The closed contacts 4L–5L of ST24 provide a ground for the operation of relay ACCNM via contact 24 of level B of CS, lead 34, contacts 2Q–1Q of finish number relay FIN–N (FIG. 1C), ACCNM coil and B—. The closure of relay ACCNM contacts 05–06 provides a path via lead 36 for the operation of bar relay BR, FIG. 1A. The operation of BR closes twenty-four pairs of contacts, two of which, 1M–2M and 3M–4M are illustrated in FIG. 1A. The closure of 1M–2M provides a holding path for STM24 via contacts 9L–10L thereof.

The operation of relay ACCNM also operates access numbering relay ACCN via ground, contacts 07–08 of ACCNM, lead 37, the coil of ACCN and B—. This initiates the readout to sampler printer 44 from levels D–H of circuit selector rotary switch CS of an identification letter corresponding to the circuit being monitored. Teletype line 1 is given the identification letter A, line 2 the letter B, etc. The identification letters are wired into the contacts of levels D–H of CS, a mark being represented by a ground and a space by no connection. For example, will all of the rotors of CS on contacts 24 as in the present example, the rotor leads 38–42 of levels D–H would indicate the Teletype code for the letter X (mark, space, mark, mark, mark) X being the twenty-fourth letter of the alphabet. Leads 38–42 are connected to the 5 and 6 contacts of levels B–F of numbering monitor rotary switch NM, FIG. 1B. The remaining contacts of levels B–F of NM are wired to provide certain desired control functions for positioning the carriage of the sampler printer 44. The 1 contacts of levels B–F of NM are wired to provide a line feed function; contacts 2, a letters shift function; contacts 3, a carriage return; contacts 4, a letters shift; contacts 7, a line feed; contacts 8, a letters shift and contacts 9, a carriage return. These control functions position the sampler printer carriage so that the identification leters for each Teletype line monitored will appear on successive lines for the printer. The operation of relay ACCN causes rotary switch NM to step off its normal or home contacts and step through all ten of its contacts. As the above rotors of NM step to the various contacts thereof, the Teletype code wired into levels B–F is fed to markable transmitter distributor MTD, which converts these signals into sequential Teletype form with stop-start and stop pulses capable of actuating sampler printer 44. The markable transmitter distributor MTD is a standard Teletype component used to convert simultaneous or parallel signals to sequential or serial Teletype code. The MTD contains a continously rotating motor which drives a pair of cams through a clutch. The clutch is engaged by clutch magnet CL. The first cam controls seven contacts in sequence. These are contacts 44–50 shown within MTD of FIG. 1B. The contact 44 represents the Teletype stop pulse and is normally closed. When the clutch magnet CL is actuated the two cams are allowed to rotate one-half a turn. The rotation of the first cam opens contacts 44 and then in sequence closes contacts 45–50. The intelligence to be converted to sequential form is fed to contacts 46 to 50 and appears on output line 52 in sequential form, the stop and start pulses being provided by contacts 44 and 45 respectively. The second cam in the MTD actuates the pulsing contacts 51, closing them during the transmission of the second intelligence bit of the Teletype character, which is provided by contacts 47 of the MTD, and opening pulsing contacts 51 at the end of the Teletype character during the stop pulse provided by contacts 44. The MTD used in the present circuitry bears standard Army-Navy nomenclature TT–174A–FG. A more detailed description of this unit will be found on pp. 349–370 of Department of the Army Technical Manual TM 11–5815–203–15, dated February 1959.

The operation of numbering monitor NM and MTD is as follows: Relay ACCN in operating closes its six lower pairs of contacts S7–S8, S10–S9, etc., and connects the rotor contacts of levels B–F of NM to the intelligence contacts 46–50 of MTD. Simultaneously, the coil of NM is operated via ground, interrupter contacts T4–T5 of NM, closed contacts S4–S5 of ACCN, normal contacts T3–T2 of NM, coil NM and B— battery. The operation of NM opens its interrupter contacts T4–T5 thereby de-energizing coil NM and causing the rotors of levels A–F of NM to step to contact 1, and also opening normal contacts T3–T2 and closing off-normal contacts T1–T2. The ground encountered at contact 1 by the rotor of level A operates the clutch magnet CL or MTD. The operation of the clutch CL causes contacts 45–50 to be closed in sequence as explained above and causes the Teletype code wired into all of the No. 1 contacts of NM levels B–F to be sequentially fed to output lead 52 of MTD. Lead 52 feeds these pulses to sampler printer 44 via closed contacts 09–011 of ACCNM, lead 53, contacts 11P–12P of relay STM, the signal winding of SCAT unit 57 and lead 55. It should be noted that the MTD provides a ground connection at its output to represent a mark and no connection to represent a space. The battery B— connected to one terminal of sampler printer 44 then provides the current to actuate the printer. During the readout of the line feed function wired into the No. 1 contacts of NM, the pulsing contacts 51 of MTD close and cause the coil of NM to operate a second time via contacts S12–S11 of ACCN. The cycle then repeats until all of the control functions wired into contacts 1, 2, 3, 4, 7, 8 and 9 of levels B–F of NM have been transferred to the sampler printer 44, as well as the identification letter of the line being monitored from contacts 4 and 5 of levels B–F of NM. When the rotor of level A of NM reaches contact 10, the upper coil of relay FIN–N is placed in series with the coil of clutch magnet CL via lead 58. Due to the different resistances of these coils, the resultant current will be sufficient to operate FIN–N but insufficient to operate CL. The operation of FIN–N completes a holding circuit therefor via battery B—, the lower coil of FIN–N, closed contacts 9Q–10Q of FIN–N, contacts 6U–5U of relay PUL, lead 34, the rotor of level B of CS to contact 24 thereof and contacts 5L–4L of ST24 to ground. The operation of FIN–N also opens contacts 2Q–1Q thereof and causes relay ACCNM to restore.

In restoring, ACCNM removes the output of the MTD from the printer by opening contacts 09–011. The opening of contacts 07–08 of ACCNM causes ACCN to restore by removing the ground on lead 37. The restoration of ACCN closes contacts S3–S4 thereof and completes the homing path for NM. NM then steps to its home or normal position. In restoring, contacts 05–06 of ACCNM open and restore bar relay BR. In operating, contacts 7Q–8Q of FIN–N operate the start monitoring relay STM via contacts 03–04 of ACCNM and lead 60. The closure of contacts 10P–12P of STM causes the Teletype signal from line 24 to be applied to the signal winding of the selector magnet 54 of SCAT unit 57. The path of this signal is from mark contact M of PR24, contact 24 of level C of CS, lead 35 through closed contacts 10P–12P of STM and thence to the signal winding of SCAT unit 57. The purpose and structure of SCAT unit 57 will be described below.

In operating, relay FIN–N also initiates the operation of the timing circuit comprising rotary counting switch CTG and timing contacts 76–77. The closed contacts 5Q–6Q of FIN–N connect the cam-driven timing contacts 76–77 to the coil of CTG, causing CTG to step once each second. Timing contacts 76–77 are closed once per second by means of a cam driven by synchronous motor SM. While the counting switch CTG is stepping, the SCAT unit 57 and its associated circuitry are reading the Teletype message text searching for a carriage return and line feed function in that order. If these two functions are not sensed within nine seconds, CTG actuates an alarm circuit. After nine seconds of stepping, the rotor of level A of CTG reaches contact 9 and operates relay ALMM via contacts 1W–2W of relay RLS. The operation of ALMM grounds lead 43 via contacts 3X–4X thereof, and operates alarm relay ALM24 via the rotor of level J of CS, contact 24 thereof and lead 62. ALM24 is one of the twenty-four similar alarm circuits, one for each Teletype line being monitored and each actuated through a different one of the twenty-four contacts on level J of CS. Only alarm relays ALM1 and ALM24 are illustrated in the drawing, however the connection of the twenty-two other alarm circuits is similar to those illustrated. When ALM24 operates, a holding circuit is established through the lower coil thereof, via contacts 9Y–10Y and manual alarm release button AR24. Also, buzzer BZ is sounded by contacts 7Y–8Y and alarm lamp ALP24 is energized through contacts 5Y–6Y. One second later the grounded rotor of level A of CTG steps to contact 10 and operates pulse step relay PUL. Contacts 5U–6U of PUL open and break the holding circuit of FIN–N, causing that relay to restore. Contacts 3U–4U of PUL ground lead 31 which provide a connection via interrupter contacts 1CS–2CS of CS and contacts 7L–8L of ST24 to operate relay INTP. INTP contacts 1N–2N operate CS. When CTG steps off of contact 10 of level A, relay PUL is restored and this in turn restores relay INTP which causes CS to step to its home position illustrated in the drawing. The restoration of relay FIN–N causes relay STM to restore by removing the ground from lead 60. The closure of contacts 3Q–4Q of FIN–N causes CTG to home to normal position by means of interrupter contacts 3V–4V and off-normal contacts 1V–2V. The automatic sampler is now in its normal or reset condition except that alarm circuit 24 is activated, indicating that Teletype line 24 is in garbled condition. Alarm circuit 24 can be reset by depressing alarm release button AR24. The unit will now repeat the entire sequence of operation described above by searching for another line carrying traffic. In the above example, should the line 24 have stopped transmission before CTG had counted nine seconds, relay ST24 would have restored since the armature of PR24 would have reverted to a steady mark condition. The restoration of ST24 would have restored both relay FIN–N and STM and homed CTG. The reception of traffic on any one of the twenty-four Teletype lines would then operate its associated start relay and initiate the sampling action of the circuitry, as explained above.

If Teletype line 24 had been in good condition in the above example, a carriage return and line feed function would have been received during the nine seconds of operation of CTG. The reception of these two functions would have actuated relay RLS and thereby prevented the actuation of the alarm circuitry. The detailed operation of this part of the circuit will now be described. SCAT unit 57 is an electromechanical Teletype code reader. Sequential Teletype characters are applied to the signal winding of the selector magnet 54 of SCAT unit 57. The armature of the selector magnet 54 is moved to one position by the presence of current in the signal winding thereof (a mark signal), and to another position in the absence of current therein (a space signal). Through a system of cams and levers, the selector magnet will close a different selector contact in the SCAT unit for each one of the thirty-two possible mark and space combinations which comprise the Teletype code. Only three of these selector contacts are required in the present circuitry, namely those which close when the blank, carriage return and line feed functions are applied to the selector magnet. These three selector contacts are indicated respectively by the reference characters 64, 65 and 66 within SCAT unit 57. In addition, the SCAT unit contains a pair of cam actuated pulsing contacts S2 and S3. S3 is closed during the middle 50% of each Teletype character and S2 is closed at all times except during the middle 37.5% of each Teletype character. Therefore there is a slight overlapping in the closures of these pulsing contacts. The SCAT unit used in the present invention is standard Teletype equipment. A detailed description of such a unit may be found in the aforementioned Technical Manual on pp. 421–480. As stated above, during the first nine seconds of operation of CTG, the Teletype line signal is being applied to the selector magnet 54 of the SCAT unit from the M contact of PR24 via contact 24 of level C of CS, lead 35 and contacts 10P–12P of STM. If a carriage return function occurs in the stream of Teletype characters applied to selector magnet 54, selector contacts 65 corresponding thereto will close and operate relay CR via ground, S3, and lead 67. Pulsing contacts S2 close before S3 opens and grounds lead 68 which grounds both terminals of the upper coil of relay LF. When pulsing contact S3 opens, the upper winding of LF is placed in series with the coil of relay CR, causing relay LF to operate. Should the next character be a line feed function, the closure of S3 and selector contacts 66 will establish a holding path for relay LF via lead 69 and contacts 4AB–5AB of LF, and the lower coil of LF, however the opening of contacts S2 during this character will remove the ground from lead 68 and cause relay CR to restore. When S2 subsequently closes and S3 opens the upper coil of relay RLS will be placed in series with the lower coil of LF via the restored, closed contacts 2Z–1Z of CR, contacts 2AB–3AB of LF and lead 68, and RLS operates. The operation of RLS establishes a holding path therefor through its lower coil contacts 6W–7W, ALMM contacts 1X–2X and PUL contacts 1U–2U. The operation of RLS opens contacts 1W–2W thereof and prevents the operation of alarm operating relay ALMM by the counting switch CTG. If the rotor of level A of CTG is on any of contacts 4, 6, 7 or 8 when RLS is operated a ground pulse is provided thereby through contacts 8W–9W of RLS for operating relay PUL. The operation of PUL causes the circuit selector switch CS to step off the circuit being monitored and search for another line carrying traffic. If, in the above example, the character following the carriage return function had been anything else but a line feed function, selector switch 66 of the SCAT unit would not have closed and no holding path would have been established for relay LF with the result that both CR and LF would have restored and RLS would not have operated. The counting switch CTG then would have initiated the alarm circuitry as explained above.

The above-described circuitry will produce a false alarm if the circuit being sampled happens to be transmitting a long series of blank functions which often follow the text of a message. In order to prevent these false alarms the relay BL is connected by lead 73 to the circuit selector contacts 64 of SCAT, which contacts are closed each time a blank function is fed to SCAT. Contacts 64 provide a circuit via lead 73 for applying battery voltage to the network comprising the resistor 71 in series with the parallel combination of capacitor 72 and the coil of relay BL. The time constant of resistor 71 and capacitor 72 is chosen so that after four consecutive blanks are read by the SCAT unit, the voltage built up across capacitor 72 will be sufficient to operate the coil of relay BL. In operating, the closed contacts 1CD–2CD of BL provide a path between contact 5 of level A of CTG and the upper terminal of the coil of relay PUL. When the rotor of level A of CTG reaches contact 5, relay PUL is operated and the sampler steps off the circuit being monitored and searches for another line carrying traffic.

The circuitry also includes means for extending the monitoring time of any Teletype line beyond the nine seconds which is provided automatically by rotary timing switch CTG. This is accomplished by means of push-button switch 75, one terminal of which is grounded and the other terminal of which is connected to the lower terminal of relay PUL. Operation of switch 75 will prevent the automatic operation of relay PUL by CTG and extend the monitoring as long as 75 is depressed. Means are also provided for manually controlled stepping of the sampler to any desired Teletype line. This is accomplished by push-button switch 74 which operates PUL and initiates the stepping of circuit selector CS to the next Teletype line carrying traffic.

While a specific embodiment of the invention has been illustrated and described, many modifications thereof will occur to those skilled in the art without departing from the inventive concepts disclosed herein, accordingly the invention should be limited only by the scope of the appended claims.

What is claimed is:

1. An automatic circuit sampler garble detector adapted to sequentially monitor a plurality of Teletype lines at a Teletype relay station comprising, a polar relay connected to each of said Teletype lines and arranged to be actuated by Teletype signals transmitted over the Teletype line connected thereto, a starting relay connected to each of said polar relays and arranged to be operated in response to the actuation of the polar relay connected thereto, a rotary circuit selector switch arranged to be automatically rotated and sequentially connected to each of said starting relays, means to halt the rotation of said rotary circuit selector switch when an operated starting relay is encountered, means responsive to the halting of said rotary circuit selector switch to read out to a sampler printer an identification letter corresponding to the Teletype line being monitored, means responsive to the completion of said read out to transfer the Teletype signal of the line being monitored from the polar relay connected thereto to an electromechanical code reader, and means to simultaneously initiate the operation of a timing circuit, means controlled by said timing circuit to actuate an alarm indicating a garbled condition on the monitored Teletype line after approximately nine seconds of operation of said timing circuit, and means connected to said electromechanical code reader to prevent the actuation of said alarm if a carriage return function and a line feed function are read in that order during the nine seconds of operation of said timing circuit, further means connected to said code reader to sense a plurality of consecutive blank functions in the Teletype signal being monitored and to release the sampler from the line being monitored in response thereto, and means controlled by said timing circuit to re-start the rotation of said rotary circuit selector switch.

2. The circuitry of claim 1 in which said means to prevent the actuation of said alarm comprises a carriage return relay adapted to be operated by the reading of a carriage return function by said code reader, a line feed relay adapted to be operated through a pair of contacts on said carriage return relay, means to hold said line feed relay in the operated condition and to cause said carriage return relay to restore upon the subsequent reading of a line feed function by said code reader, and further relay means adapted to be operated only if said carriage return relay is in the restored condition and said line feed relay is in the operated condition, said further relay means including a pair of contacts which open on the operation thereof and prevent the actuation of said alarm circuitry.

3. The circuitry of claim 1 further including manually operable switch means for extending the nine second operating time of said timing circuit and further manually operable switch means for manually controlling the operation of said rotary circuit selector switch, whereby any desired Teletype line may be monitored.

4. Circuitry for automatically detecting errors in Teletype transmission comprising, means to sequentially read the Teletype text on a plurality of Teletype lines for a period of time somewhat longer than that required to transmit one line of message text, and means to actuate an alarm if a carriage return function and a line feed function are not read in that order during said period of time.

5. An automatic circuit sampler garble detector adapted to sequentially monitor a plurality of Teletype lines at a Teletype relay station comprising, a polar relay connected to each of said Teletype lines and arranged to be actuated by Teletype signals transmitted over the Teletype line connected thereto, a starting relay connected to each of said polar relays and arranged to be operated in response to the actuation of the polar relay connected thereto, a rotary circuit selector switch arranged to be automatically rotated and sequentially connected to each of said starting relays, means to halt the rotation of said rotary circuit selector switch when an operated starting relay is encountered, means responsive to the halting of said rotary circuit selector switch to read out to a sampler printer an identification letter corresponding to position at which said rotary circuit selector switch has halted, means responsive to the completion of said read out to transfer the Teletype signal of the line being monitored from the polar relay connected thereto to a Teletype code reader and means to simultaneously initiate the operation of a timing circuit, means controlled by said timing circuit to actuate an alarm indicating a garbled condition on the monitored Teletype line after said timing circuit has operated for a period of time somewhat longer than is required to transmit one line of message text, and means connected to said code reader to prevent the actuation of said alarm if a carriage return function and a line feed function are read in that order during said period of time; said last-named means comprising, a carriage return relay adapted to be operated by the reading of a carriage return function by said code reader, a line feed relay adapted to be operated through a pair of contacts on said carriage return relay, means to hold said line feed relay in the operated condition and to cause said carriage return relay to restore upon the subsequent reading of a line feed function by said code reader, and further relay means adapted to be operated only if said carriage return relay is in the restored condition and said line feed relay is in the operated condition, said further relay means including a pair of contacts which open on the operation thereof and prevent the actuation of said alarm circuitry, further means connected to said code reader to sense a plurality of consecutive blank functions in the Teletype signal being monitored and to cause said rotary selector switch to step off the line being monitored in response thereto, and means controlled by said timing circuit to re-start the rotation of said rotary circuit selector switch.

6. An automatic circuit sampler garble detector comprising, means to select one of a plurality of Teletype lines carrying traffic, means to identify the selected line, automatic means to read the message text on said selected line for a period of time longer than that required to transmit one line of message text and means to actuate an alarm corresponding to the selected circuit if a carriage return function and a line feed function are not read in that order during said period of time.

References Cited by the Examiner

UNITED STATES PATENTS

| | | | |
|---|---|---|---|
| 2,430,447 | 11/1947 | Branson et al. | 178—4 |
| 2,522,874 | 9/1950 | Kahn | 178—69 |
| 2,966,113 | 12/1960 | Deerfield et al. | 178—23.1 |

NEIL C. READ, *Primary Examiner.*

WALTER L. LYNDE, *Examiner.*

A. J. DUNN, T. A. ROBINSON, *Assistant Examiners.*